United States Patent Office 2,929,134
Patented Mar. 22, 1960

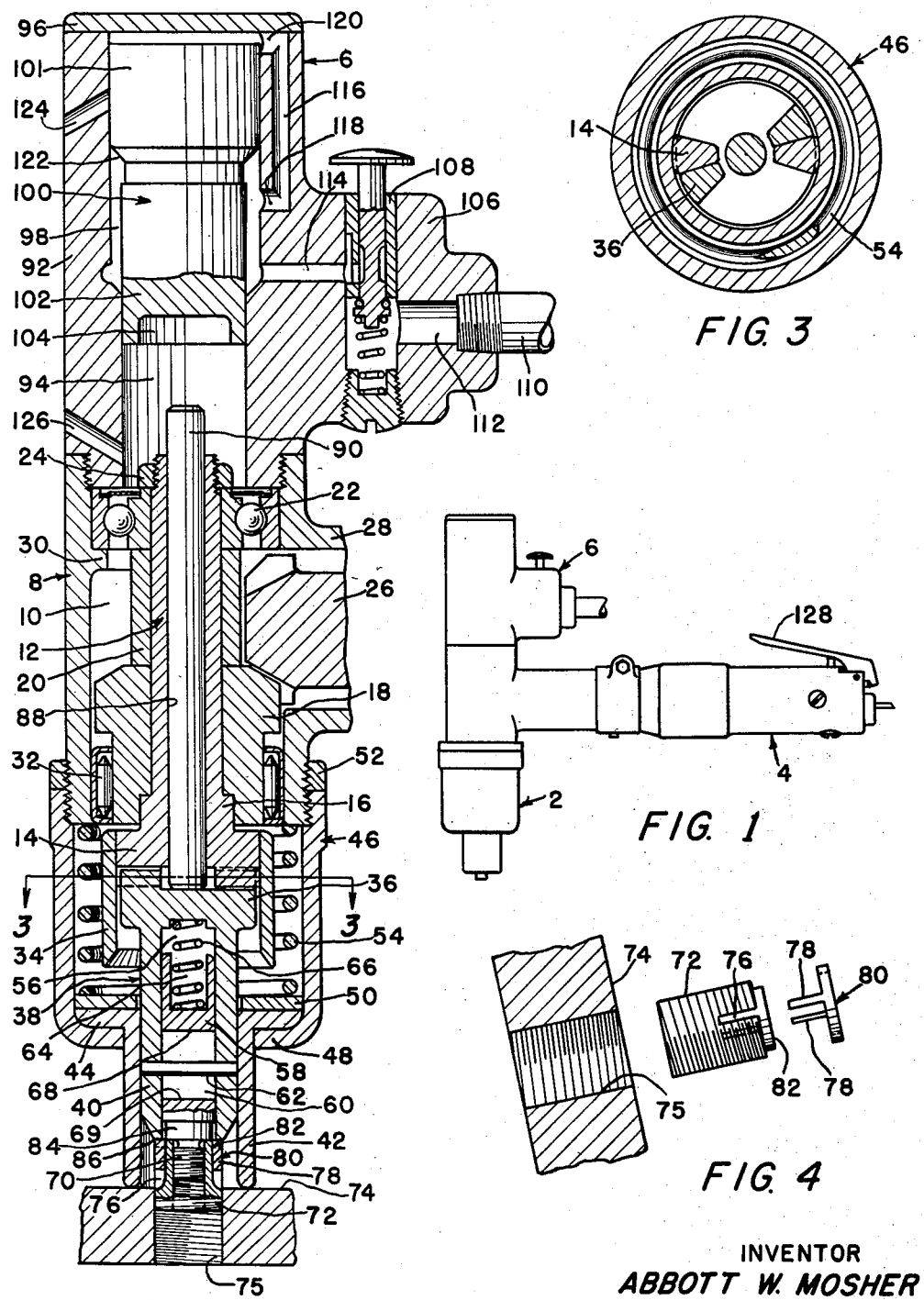

2,929,134

ROTATION AND IMPACT TOOL

Abbott W. Mosher, Portland, Maine, assignor to Ingersoll-Rand Company, New York, N.Y., a corporation of New Jersey Application May 16, 1957, Serial No. 659,622

9 Claims. (Cl. 29—240)

This invention relates to rotation and impact tools, and more particularly to tools for attaching an element to a workpiece by applying rotary and impact forces.

An object of the present invention is to provide a rotation and impact tool of relatively simple and compact design.

Other objects will become obvious from the following specification and drawings, in which Figure 1 is a side view of the entire rotation and impact tool, Fig. 2 is a longitudinal view, partly in section, of parts of the rotation and impact tool, Fig. 3 is a transverse section taken along the line 3—3 of Fig. 1, looking in the direction indicated by the arrows, and Fig. 4 is an exploded view of a workpiece, bushing, and pronged washer.

Referring to the drawings, the rotation and impact tool, as shown in Fig. 1, comprises, in general, a spindle portion 2 to which a rotary motor 4 and a reciprocatory motor 6 are attached. In the particular embodiment shown, the function of the spindle portion 2 is to screw a work element such as the bushing 72 into a threaded hole 75 of a workpiece 74 and then to lock the bushing in place by hammering a pronged washer 80 onto the bushing 72 so that the prongs 78 fit into grooves 76 in the bushing 72 and cut through the threads of the threaded hole 75 of the workpiece 74.

The rotary motion for screwing the bushing into the workpiece is provided by the rotary air motor 4 which has a driving connection for rotating the spindle 12. The spindle 12 rotates an anvil 38 through a clutch connection therewith. The anvil 38 has a sliding connection with and rotates a connecting member 58. The bushing 72 is screwed on the forward end of the connecting member 58 for rotation therewith.

The reciprocatory motion for hammering the pronged washer onto the bushing is provided by the reciprocatory air motor 6, which, through its hammer piston 100, delivers impact forces to a rod 90 extending axially through the spindle 12. The rod 90 strikes the anvil 38, which then moves forward to hammer the pronged washer 80 onto the bushing 72.

Referring now in detail to the construction of the rotation and impact tool, a tubular casing member 8 includes a chamber 10 in which a spindle 12 is mounted for rotation. The spindle 12 terminates at its forward end in the rearward jaw 14 of a clutch. The part of the spindle 12 immediately adjoining the clutch upper jaw 14 is in the form of a hexagonal shoulder 16, on which is mounted a beveled gear 18 for rotation therewith.

Also mounted on and encircling the spindle 12 is a spacer bushing 20 located between the beveled gear 18 and a ball bearing assembly 22. A nut 24 screwed on the rearward end of the spindle 12 holds the ball bearing assembly 22, the spacer bushing 20, and the beveled gear 18 tightly against the shoulder 16 of the spindle 12 for rotation therewith. The ball bearing assembly 22 is mounted in the rearward part of the chamber 10 and is held against a shoulder 30 on the inside of the tubular casing member 8. The beveled gear 18 is mounted for rotation in the chamber 10 of the tubular casing member 8 by means of a needle bearing assembly 32. The beveled gear 18 is in mesh with the bevel pinion on the shaft 26 of the rotary motor 4. The shaft 26 enters the casing member 8 through a tubular section 28 extending laterally outward from the rearward portion thereof.

The rotary motion of the spindle 12 is transmitted to the bushing 72 by means of the anvil 38 which has a shaft portion 40 mounted for limited longitudinal movement in a tubular stop member 42. The anvil 38 has at its rearward end a forward clutch jaw 36 which is movable into and out of engagement with the rearward clutch jaw 14 and is guided in such movement by a sleeve 34 attached to and extending forwardly of the rearward clutch jaw 14 on the spindle 12.

Although rotation of the anvil 38 can be manually halted by the operator's stopping the rotary motor 4 whenever the work element is advanced a predetermined distance into the workpiece, in the particular embodiment shown, stop means are provided for automatically halting the rotation of the anvil 38 when the bushing 72 has been screwed to the desired depth in the threaded hole 75. The stop means shown includes the stop member 42 which has at its rearward end an extraverted flange 44 which rests on the introverted flange 48 of a tubular holder 46. The rearward end of the holder 46 is screwed onto the forward end of the tubular casing member 8. A lock nut 52 locks the holder 46 in place on the tubular casing member 8. A cushion disc 50 rests on the flange 44 for cushioning the impact of the anvil 38 in the event that the anvil 38 is driven forwardly when the tool is not in a position to strike a work element. A relatively heavy spring 54 interposed in the holder 46 between the casing member 8 and the cushion disc 50 constantly urges the stop member 42 against the introverted flange 48 of the holder 46.

The anvil 38 has at its forward end a longitudinal cylindrical recess 56 in which is slidably mounted a connecting member 58. In the connecting member 58 is formed a longitudinally elongated slot 60. A pin 62 passes through the slot 60 and is anchored in the shaft portion 40 of the anvil 38, engaging the connecting member 58 against rotational motion but permitting limited longitudinal motion with respect to the anvil 38. The connecting member has a cylindrical longitudinal recess 64 in the rearward portion thereof. A spring 66, having one end in the recess 64 of the connecting member 58 and the other in the recess 56 of the anvil 38, and compressed therebetween, constantly urges the connecting member 58 outwardly from the recess 56 of the anvil 38 and urges the rearward end 68 of the slot 60 against the pin 62.

The connecting member 58 terminates at its forward end in a threaded arbor 70 on which the element to be rotated is screwed. In Figs. 2 and 4 an internally and externally threaded bushing 72 is shown, for illustration only, as the element to be rotated and inserted into a workpiece 74. The bushing 72 has two diametrically opposed longitudinal grooves 76 cut into its external threads for receiving the prongs 78 of a pronged washer 80 which fits on a reduced collar 82 on the rearward end of the bushing 72.

Before being driven on the bushing 72, the pronged washer 80 is pushed back onto a reduced collar 84 of the connecting member 58. The washer 80 has a sufficiently greater outside diameter than the internal diameter of the forward end of the anvil 38 so that a shoulder 86 of the anvil 38 will drive the washer 80 forwardly when the anvil 38 moves forwardly with respect to the connecting member 58.

In the particular embodiment shown, there is formed through the spindle 12 an axial bore 88 in which is slidably mounted a rod 90 for transferring impact forces from the hammer piston 100 to the anvil 38 by striking the clutch forward jaw 36. The rod 90 must be sufficiently longer than the bore 88 so that it can be struck by the hammer piston 100. On the rearward end of the tubular casing member 8 is screwed the reciprocatory motor 6 which consists of a casing 92 having an axial bore 94 therethrough. The rearward end of the casing 92 is closed by means of a disc 96 which is attached thereto. Slidably mounted in an enlarged portion 98 of the bore 94 is the greater-diametered portion 101 of the hammer piston 100 for reciprocatory motion. The smaller-diametered portion 102 of the piston 100 has a sliding fit in the bore 94. Formed in the forward end of the piston 100 is a recess 104 so that the piston 100 does not contact the nut 24 when it strikes the rod 90.

In a boss 106 on the casing 92 is mounted a thumb valve 108 for controlling the air supply to the bore 94 for reciprocating the piston 100. An air supply tube 110 is screwed into the boss 106 and communicates with a passage 112 which, when the thumb valve 108 is depressed, communicates with a passage 114 which communicates with the enlarged portion 98 of the bore 94.

Also formed in the casing 92 is a passage 116 which at its forward end communicates with the enlarged portion 98 by a port 118 located intermediate the ends of the enlarged portion 98 and at its rearward end by a port 120 located at the rearward end of the enlarged portion 98. The passage 116 and the ports 118 and 120 serve to conduct compressed air from the forward end of the enlarged portion 98 to the rearward end of the enlarged portion 98 for actuating the piston 100 forwardly. On the forward part of the greater-diametered portion 101 of the piston 100 is a pressure surface 122 for driving the piston rearwardly. A port 124 exhausts the rearward end of the enlarged portion 98, and a port 126 vents from the forward end of the bore 94.

In operation, the pronged washer 80 is first put into position on the bushing 72 with the prongs 78 in the grooves 76. The bushing 72 is then screwed into place on the arbor 70. The stop member 42 is placed against the surface of the workpiece 74 with the bushing 72 in position to be screwed into the threaded hole 75. When the operator starts the air rotary motor 4 by depressing the valve handle 128, the shaft 26 of the motor 4 rotates the beveled gear 18 which by means of the connection at the hexagonal shoulder 16 rotates the spindle 12. The spindle 12 by means of the clutch jaws 14 and 36 rotates the anvil 38 which, in turn, by means of the pin 62 rotates the connecting member 58. The connecting member 58 rotates the bushing 72 and screws it into the threaded hole 75 in the workpiece 74.

As the bushing 72 is screwed into the threaded hole 75, the connecting member 58 and the anvil 38 advance along with the bushing 72. The clutch forward jaw 36 of the anvil 38 is thus gradually drawn away from the clutch rearward jaw 14 of the spindle 12. When the bushing 72 has been screwed to the desired depth in the threaded hole 75, the anvil 38 has moved completely out of engagement with the spindle 12. The anvil 38 thus has ceased to rotate and has ceased, through the connecting member 58, to advance the bushing 72 into the workpiece 74.

In order to insert the prongs 78 of the washer 80 all the way into the grooves 76 of the bushing 72 to lock the bushing 72 in place in the threaded hole 75 in the workpiece 74, the operator stops the rotary air motor 4 and opens the thumb valve 108 of the reciprocatory air motor 6. The compressed air then enters from the supply tube 110 into the passage 112, flows through the thumb valve 108 into the passage 114, and thence into the enlarged portion 98 of the bore 94. When the piston 100 is in the position shown in Fig. 2, the compressed air enters through the port 118 into the passage 116 and flows through the port 120 into the part of the enlarged portion 98 located rearwardly of the greater-diametered portion 101 of the piston 100. The compressed air, acting on the rearward end of the greater-diametered portion 101 drives the piston 100 forwardly to strike the rod 90, which, in turn, strikes the anvil 38. Any air in the bore 94 is vented through the port 126 when the piston 100 moves forwardly. The anvil 38 then moves forwardly, being guided by the sleeve 34 and the stop member 42, and its shoulder 86 strikes the washer 80 and drives the prongs 78 all the way into the grooves 76 of the bushing 72. The prongs 78 cut through the threads of the threaded hole 75 and lock the bushing 72 in place in the threaded hole 75. When the anvil 38 is struck by the rod 90, it moves forwardly with respect to the connecting member 58, compressing the spring 66, and moving the pin 62 from the rearward end 68 of the slot 60 toward the forward end 69 of the slot 60.

When the greater-diametered portion 101 of the piston 100 has moved a sufficient distance forwardly to uncover the port 124 and to cover the port 118, the air rearwardly of the piston is exhausted through the port 124, and the compressed air in the enlarged portion 98 acts on the pressure surface 122 driving the piston rearwardly. Several such blows of the anvil may be required to seat the washer 80 on the bushing 72.

To unscrew the arbor 70 of the connecting member 58 out of the bushing 72 after the bushing has been inserted into the threaded hole 75 and the washer 80 has been seated on the bushing 72, the operator presses the tool down against the workpiece 74. In consequence, the stop member 42 is moved back with respect to the introverted flange 48 of the holder 46, compressing the spring 54, and the anvil 38 is moved back into clutch engagement with the spindle 12. The operator then starts the rotary motor 4 in the reverse direction, which rotates the anvil in the reverse direction and unscrews the connecting member 58 from the bushing 72.

I claim:

1. A tool for rotating and hammering a work element, comprising a casing, a rotary motor mounted in said casing, a spindle disposed in said casing and having a driving connection with said rotary motor, a reciprocatory motor mounted in said casing, an anvil disposed in said casing and arranged to be urged by said reciprocatory motor for striking the work element, means engaging said spindle and said anvil for the transfer of rotary motion therebetween, and a connecting member engaged to the anvil for rotation therewith and movable longitudinally with respect to said anvil, said connecting member connectable to the work element to be rotated.

2. A tool for rotating and hammering a work element, comprising a casing, a rotary motor mounted in said casing, a spindle disposed in said casing and arranged to be driven by said rotary motor, a reciprocatory motor mounted in said casing, an anvil disposed in said casing and arranged to be urged by said reciprocatory motor for striking the work element, clutch means on said spindle and said anvil for disengaging and engaging said spindle and said anvil for the transfer of rotary motion, a connecting member engaged for rotation with said anvil and movable longitudinally with respect to said anvil, said connecting member being adapted to be connected to the work element to be rotated, and a stop member extending beyond said casing and cooperating with said clutch means for causing disengagement thereof for limiting the advance of the work element into the workpiece.

3. A tool for rotating and hammering a work element, comprising a casing, a rotary motor mounted in said casing, a spindle disposed in said casing connected to said rotary motor to be driven thereby, a reciprocatory motor mounted in said casing, a rod arranged to be moved by said reciprocatory motor, an anvil disposed in said casing and arranged to be urged by said rod for striking the work element, clutch means on said spindle and said anvil for disengaging and engaging said spindle and said anvil for the transfer of rotary motion, and a connecting member having a driving connection with the anvil connected for rotation with said anvil and movable longitudinally with respect to said anvil, said connecting member being adapted to be connected to the work element to be rotated.

4. A tool for rotating and hammering a work element, comprising a casing, a rotary motor mounted in said casing, a spindle disposed in said casing and arranged to be driven by said rotary motor, a reciprocatory motor mounted in said casing, a rod arranged to be moved by said reciprocatory motor, an anvil disposed in said casing and arranged to be urged by said rod for striking the work element, clutch means on said spindle and said anvil for disengaging and engaging said spindle and said anvil for the transfer of rotary motion, a connecting member engaged for rotation with said anvil and movable longitudinally with respect to said anvil, said connecting member being adapted to be connected to the element to be rotated, and a stop member extending beyond said casing and cooperating with said clutch means for causing disengagement thereof for limiting the advance of the work element relative to the workpiece.

5. A tool for rotating and hammering a work element to a workpiece, comprising a casing, a rotary motor mounted in said casing, a spindle disposed in said casing and arranged to be driven by said rotary motor, said casing having a chamber in a part thereof, a hammer piston reciprocable in said chamber, a passage and ports in said casing for cooperating with said piston for valving compressed air to the opposite end portions of said chamber for actuating said piston, a rod slidable in said spindle and arranged to be moved by said piston, an anvil disposed in said casing and arranged to be struck by said rod for striking the work element, clutch means on said spindle and said anvil for disengaging and engaging said spindle and said anvil for the transfer of rotary motion, a connecting member connected to the anvil for rotation with said anvil and having limited longitudinal motion with respect to said anvil, said connecting member having means for connecting said element to the work element for rotation thereof.

6. A tool for rotating and hammering a work element, comprising a T-shaped casing, a rotary motor mounted in the stem of said T-shaped casing which serves as a handle, a spindle disposed in one of the arms of said T-shaped casing and arranged to be driven by said rotary motor, a reciprocatory motor mounted in the other arm of said T-shaped casing, an anvil disposed in said casing and arranged to be urged by said reciprocatory motor for striking the work element, clutch means on said spindle and said anvil for disengaging and engaging said spindle and said anvil for the transfer of rotary motion, and a connecting member connected to the anvil for rotation with said anvil and movable longitudinally with respect to said anvil, said connecting member having means for engaging the work element to be rotated.

7. A tool for rotating and hammering a work element, comprising a T-shaped casing, a rotary motor mounted in the stem of said T-shaped casing which serves as a handle, a spindle disposed in one of the arms of said T-shaped casing and arranged to be driven by said rotary motor, a reciprocatory motor mounted in the other arm of said T-shaped casing, an anvil disposed in the first said arm of the casing and arranged to be urged by said reciprocatory motor for striking the work element, clutch means on said spindle and said anvil for disengaging and engaging said spindle and said anvil for the transfer of rotary motion, a connecting member engaged for rotation with said anvil and movable longitudinally with respect to said anvil, said connecting member being adapted to be connected to the work element to be rotated, and a stop member extending beyond said casing and cooperating with said clutch means for causing disengagement thereof for limiting the advance of the work elment into the workpiece.

8. A tool for rotating and hammering a work element, comprising a casing, an anvil in the casing adapted to rotate and to strike a longitudinal blow on the work element, a rotary motor in the casing, means for connecting the motor with the anvil to rotate the anvil, a reciprocatory motor in the casing, and means for transmitting motion of said reciprocatory motor in one direction to said anvil for striking such blow, said anvil including a work connecting member connected to the anvil for rotation therewith and movable longitudinally with respect thereto.

9. A tool for rotating and hammering a work element into a workpiece, comprising a casing, an anvil in the casing adapted to rotate and to strike a longitudinal blow on the work element, a rotary motor in the casing connected to rotate the anvil, a reciprocatory motor in the casing, means for transmitting motion of said reciprocatory motor in one direction to said anvil for striking such blow, said anvil including a connecting member engaged for rotation therewith and movable longitudinally with respect thereto, and stop means for halting rotation of said anvil whenever the work element is advanced a predetermined distance relative to the workpiece.

References Cited in the file of this patent

UNITED STATES PATENTS

| | | |
|---|---|---|
| 1,009,248 | Jenkins | Nov. 21, 1911 |
| 2,438,744 | Flynn | Mar. 30, 1948 |
| 2,518,009 | Hess | Aug. 8, 1950 |
| 2,602,361 | Meyer | July 8, 1952 |
| 2,760,393 | Stough | Aug. 28, 1956 |